(12) United States Patent
Oguni et al.

(10) Patent No.: US 8,168,690 B2
(45) Date of Patent: May 1, 2012

(54) SOLVENT-FREE PHOTOCURABLE RESIN COMPOSITION FOR PROTECTIVE FILM

(75) Inventors: Kiichiro Oguni, Tochigi (JP); Kozaburo Hayashi, Tochigi (JP); Satoshi Yanagida, Tochigi (JP); Hidetoshi Watanabe, Tokyo (JP); Naoki Okawa, Tokyo (JP)

(73) Assignees: Sony Chemical & Information Device Corp., Tokyo (JP); Sony Corp., Tokyo (JP); Sony Disc & Digital Solutions Inc., Tokyo (JP)

(*) Notice: Subject to any disclaimer, the term of this patent is extended or adjusted under 35 U.S.C. 154(b) by 4 days.

(21) Appl. No.: 11/658,642

(22) PCT Filed: Aug. 1, 2005

(86) PCT No.: PCT/JP2005/014036
§ 371 (c)(1),
(2), (4) Date: Jan. 26, 2007

(87) PCT Pub. No.: WO2006/016493
PCT Pub. Date: Feb. 16, 2006

(65) Prior Publication Data
US 2008/0153937 A1    Jun. 26, 2008

(30) Foreign Application Priority Data

Aug. 10, 2004  (JP) ................ 2004-233605

(51) Int. Cl.
| C03C 25/28 | (2006.01) |
| C08F 2/46 | (2006.01) |
| C08F 220/20 | (2006.01) |
| B32B 3/00 | (2006.01) |
| G03F 7/028 | (2006.01) |
| G03F 7/033 | (2006.01) |

(52) U.S. Cl. .......... 522/96; 522/186; 526/242; 526/245; 526/301; 428/64.4; 428/65.1; 428/65.2; 428/913; 430/270.1; 430/270.11

(58) Field of Classification Search ............ 522/96, 522/97, 186; 526/242, 245, 301; 428/64.4, 428/65.1, 65.2, 913; 430/270.1, 270.11
See application file for complete search history.

(56) References Cited

U.S. PATENT DOCUMENTS
6,337,118 B1    1/2002   Takehana et al.
(Continued)

FOREIGN PATENT DOCUMENTS
CN           1324389 A      11/2001
(Continued)

OTHER PUBLICATIONS

Chinese Office Action w/English-translation dated Oct. 30, 2009 in Chinese Patent Application No. 200580027373.7.
(Continued)

Primary Examiner — Michael Pepitone
(74) Attorney, Agent, or Firm — Oliff & Berridge, PLC

(57) ABSTRACT

A solvent-free photocurable resin composition is provided which can be applied to the surface of optical discs or the like to form a highly transparent protective film that can stably adhere to the surface and effectively protect the surface from scratches. The solvent-free photocurable resin composition contains a urethane(meth)acrylate oligomer, a trifunctional (meth)acrylic acid ester monomer, a photopolymerization initiator, and a dilution monomer. The dilution monomer contains a fluorine-based (meth)acrylic acid ester monomer having three or more fluorine atoms and a monofunctional or difunctional (meth)acrylic acid ester monomer in amounts of from 10 to 40 wt% and from 10 to 30 wt%, respectively.

14 Claims, 1 Drawing Sheet

1

U.S. PATENT DOCUMENTS

| | | |
|---|---|---|
| 6,440,519 B1 | 8/2002 | Takase et al. |
| 7,655,307 B2 | 2/2010 | Kim et al. |

FOREIGN PATENT DOCUMENTS

| | | |
|---|---|---|
| CN | 1370317 A | 9/2002 |
| JP | A 04-102240 | 4/1992 |
| JP | A 06-180859 | 6/1994 |
| JP | A 11-100419 | 4/1999 |
| JP | A 11-293159 | 10/1999 |
| JP | A 2000-063446 | 2/2000 |
| JP | A 2002-037827 | 2/2002 |
| JP | A 2003-105043 | 4/2003 |
| JP | A-2006-523728 | 10/2006 |
| KR | 2001-0072808 | 7/2001 |
| WO | WO 2004090636 A1 * | 10/2004 |

OTHER PUBLICATIONS

Nov. 17, 2010 Office Action issued in Japanese Patent Application No. 2004-233605 (with translation).

Korean Patent Office, Notice of Grounds for Rejection mailed Jan. 27, 2012 in Korean Patent Application No. 2007-7003057 w/English-language Translation.

* cited by examiner

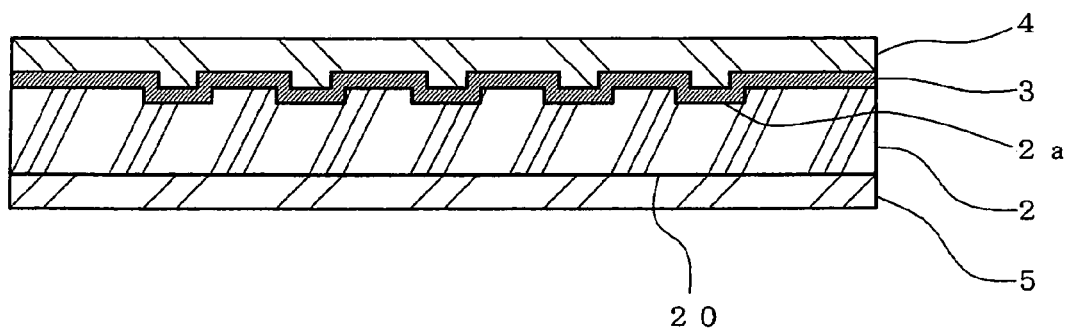

SOLVENT-FREE PHOTOCURABLE RESIN COMPOSITION FOR PROTECTIVE FILM

TECHNICAL FIELD

The present invention relates to a resin composition used to make protective films to protect compact discs (CDs), digital versatile discs (DVDs) and other optical discs. In particular, the present invention relates to a solvent-free photocurable resin composition that can be photocured to make protective films containing no residual organic solvents.

BACKGROUND ART

A photocurable resin composition is generally applied to the surface of an optical disc to make the surface scratch-resistant. Such a composition typically contains inorganic particles such as colloidal silica so that the composition can form a highly scratch-resistant film when photocured.

However, the presence of the inorganic particles in the photocurable resin composition deteriorates the flatness and the transparency of the cured film formed over the optical disc substrate. For this reason, a photocurable resin composition has been proposed that contains, instead of the inorganic particles, 50 to 90 wt % of a fluorine-based acrylate monomer and an acrylate or a methacrylate (collectively referred to as (meth)acrylate, hereinafter) having hydrophilic groups (See, Patent Document 1). This resin composition can form highly smooth resin films. A photocurable hard coat composition has also been proposed that is composed of a photocurable resin mixed with 0.01 to 3 wt % of non-crosslinkable fluorine-based surfactant and 0.1 to 5 wt % of crosslinkable fluorine-based surfactant (See, Patent Document 2).

[Patent Document 1] Japanese Patent Application Laid-Open No. 2003-105043
[Patent Document 2] Japanese Patent Application Laid-Open No. Hei 11-293159

DISCLOSURE OF THE INVENTION

Problems to be Solved by the Invention

However, the resin composition described in Patent Document 1 does not adhere well to the surface of optical discs to which it is applied. On the other hand, the hard coat layer formed from the hard coat composition described in Patent Document 2 often has decreased transparency due to the non-crosslinkable fluorine-based surfactant aggregated on the surface of optical discs. In addition to this, the non-crosslinkable fluorine-based surfactant aggregated on the surface of discs can readily be wiped off, resulting in unstable scratch resistance of the discs. Furthermore, this composition is intended to be used with organic solvents to improve the applicability of the composition. These organic solvents are volatile and affect the integrity of the coating as they evaporate (for example, by formation of bubbles, dust adhesion, formation of uneven stripes or irregular surface features). The use of organic solvents also causes unfavorable working environment, requires cost to recover the solvents, and makes the surface of optical discs rough.

The present invention addresses the above-described problems of the conventional technology: It is an object of the present invention to provide a solvent-free photocurable resin composition that can be applied to the surface of optical discs or the like to form protective films that can not only stably adhere to the surface and effectively protect the surface from scratches, but are also highly transparent.

Means to Solve the Problems

The present inventors have discovered that a protective film formed from a particular solvent-free photocurable resin composition meets all of the above-described requirements, and have devised the present invention based on this discovery. Specifically, the solvent-free photocurable resin composition includes a urethane(meth)acrylate oligomer, a trifunctional (meth)acrylic acid ester monomer, a photopolymerization initiator, and a dilution monomer. The dilution monomer includes a fluorine-based (meth)acrylic acid ester monomer having three or more and less than seventeen fluorine atoms in its molecule and a monofunctional or difunctional (meth)acrylic acid ester monomer in predetermined proportions.

In particular, the present invention provides a solvent-free photocurable resin composition that includes a urethane (meth)acrylate oligomer, a trifunctional (meth)acrylic acid ester monomer, a photopolymerization initiator, and a dilution monomer with the dilution monomer including 10 to 40 wt % of a fluorine-based (meth)acrylic acid ester monomer having three or more and less than seventeen fluorine atoms in its molecule and 10 to 30 wt % of a monofunctional or difunctional acrylic acid ester monomer.

The present invention also provides an optical disc including an optical disc substrate and a cured film of the above-described solvent-free photocurable resin composition formed over the substrate.

ADVANTAGES OF THE INVENTION

As described above, the solvent-free photocurable resin composition of the present invention uses a reactive dilution monomer rather than organic solvents. This reactive dilution monomer includes a fluorine-based (meth)acrylic acid ester monomer having three or more fluorine atoms in its molecule and a monofunctional or difunctional acrylic acid ester monomer in predetermined proportions. Thus, the solvent-free photocurable resin composition can be applied to the surface of optical discs or the like and can be photocured there to form a protective film that not only stably adheres to the surface and effectively protects the surface from scratches, but is also highly transparent.

BRIEF DESCRIPTION OF THE DRAWINGS

FIG. 1 is a schematic cross-sectional view of an optical disc of the present invention.

DESCRIPTION OF REFERENCE NUMERALS

| | |
|---|---|
| 1 | Optical disc |
| 2 | Optical disc substrate |
| 2a | Recording pattern |
| 3 | Reflective film |
| 4 | Protective film |
| 5 | Optical disc protective film |

BEST MODE FOR CARRYING OUT THE INVENTION

The solvent-free photocurable resin composition of the present invention includes a urethane (meth)acrylate oligomer, a trifunctional (meth)acrylic acid ester monomer, a photopolymerization initiator, and a dilution monomer with the dilution monomer including a fluorine-based (meth)acrylic acid ester monomer having three or more and less than seventeen fluorine atoms in its molecule and a monofunctional or difunctional (meth)acrylic acid ester monomer. The use of the dilution monomer makes it possible to adjust the viscosity of the solvent-free photocurable resin composition to a value suitable for application to the surface of optical discs without using organic solvents. The solvent-free photocurable resin composition preferably has a viscosity of 20 to 300 mPa·S, and more preferably a viscosity of 30 to 100 mPa·S as determined by a cone-plate viscometer (at 25° C.).

In the present invention, the urethane (meth)acrylate oligomer serves to give hardness to the solvent-free photocurable resin composition. Each molecule of the urethane (meth) acrylate oligomer has at least one, preferably three or more, and more preferably six (meth)acroyl groups in order to enhance the scratch resistance.

Specific examples of the urethane (meth)acrylate oligomer includes CN999 (an aromatic hexafunctional product manufactured by Sartomer Co., Ltd.), CN968 (an aliphatic hexafunctional product manufactured by Sartomer Co., Ltd.) and CN973 (an aromatic difunctional product manufactured by Sartomer Co., Ltd.).

The amount of the urethane (meth)acrylate oligomer in the solvent-free photocurable resin composition is preferably in the range of 10 to 45 wt %, and more preferably in the range of 15 to 40 parts by weight. Too little of the compound results in decreased scratch resistance whereas too much of it causes too high a viscosity.

In the present invention, the trifunctional (meth)acrylic acid ester monomer serves to increase the crosslinking density of the solvent-free photocurable resin composition. Specific examples of the trifunctional (meth)acrylic acid ester monomer include trimethylolpropane tri(meth)acrylate, trimethylolethane tri(meth)acrylate, glycerol tri(meth)acrylate, pentaerythritol tri(meth)acrylate, pentaerythritol tetra(meth) acrylate, dipentaerythritol penta(meth)acrylate, and dipentaerythritol hexa(meth)acrylate.

The amount of the trifunctional (meth)acrylic acid ester monomer in the solvent-free photocurable resin composition is preferably in the range of 10 to 30 wt %, and more preferably in the range of 10 to 20 parts by weight. Too little of the ester monomer results in decreased scratch resistance whereas too much of it leads to increased contraction upon curing.

The photopolymerization initiator for use in the present invention may be one of known initiators selected depending on the urethane (meth)acrylate oligomer and the trifunctional (meth)acrylic acid ester monomer used. Of known photopolymerization initiators, photoradical initiators that do not color upon curing are preferred, including 2-hydroxy-2-methyl-1-phenylpropane-1-one, 1-hydroxy-cyclohexyl-phenylketone, and 2,4,6-trimethylbenzoyl diphenylphosphinoxide. If necessary, the photopolymerization initiator may be used in combination with a photosensitizer such as ethyl N,N-dimethylaminobenzoate.

The amount of the photopolymerization initiator in the solvent-free photocurable resin composition is preferably in the range of 5 to 15 parts by weight, and more preferably in the range of 8 to 12 parts by weight with respect to 100 parts by weight of polymerizable compounds present in the solvent-free photocurable resin composition. Too little of the photopolymerization initiator results in decreased scratch resistance whereas too much of the initiator leads to increased contraction upon curing.

In the present invention, the fluorine-based (meth)acrylic acid ester monomer having three or more and less than seventeen fluorine atoms in its molecule is used in combination with the monofunctional or difunctional (meth)acrylic acid ester monomer to serve as the dilution monomer. The fluorine-based (meth)acrylic acid ester monomer having three or more fluorine atoms in its molecule is used to adjust the viscosity of the solvent-free photocurable resin composition and give high scratch resistance to the cured film. The monofunctional or difunctional (meth)acrylic acid ester monomer serves to balance the scratch resistance, the adhesion of the cured film, and the applicability of the composition since the adhesion of the cured film to the applied surface decreases when the dilution monomer is composed only of the fluorine-based (meth)acrylic acid ester monomer having three or more and less than seventeen fluorine atoms. The (meth)acrylic acid ester monomer used as the dilution monomer in the present invention has 1 or 2 functional groups since the adhesion of the cured film to the applied surface decreases and the viscosity of the composition increases when the monomer has 3 or more functional groups.

The proportions of the fluorine-based (meth)acrylic acid ester monomer having three or more fluorine atoms in its molecule and the monofunctional or difunctional (meth) acrylic acid ester monomer that together serve as the dilution monomer in the solvent-free photocurable resin composition are preferably in the ranges of 10 to 40 wt % and 10 to 30 wt %, respectively, and more preferably in the ranges of 20 to 30 wt % and 15 to 25 wt %, respectively.

While the dilution monomer may have any suitable viscosity, it is preferably less viscous than the composition: The dilution monomer preferably has a viscosity of 15 to 20 mPa·S, and more preferably a viscosity of 15 to 10 mPa·S as determined by a cone-plate viscometer (at 25° C.). This improves the applicability of the composition to the surface of optical disc substrates.

Specific examples of the fluorine-based (meth)acrylic acid ester monomer having three or more fluorine atoms in its molecule to serve as the reactive dilution monomer include trifluoroethyl triacrylate, tetrafluoropropylacrylate, tetrafluoroethylacrylate, octafluoropentylacrylate, tetrafluoroethyl methacrylate, and octafluoropentyl methacrylate.

Examples of the monofunctional or difunctional (meth) acrylic acid ester monomer to serve as the reactive dilution monomer include mono(meth)acrylate monomers of alcohols having cyclic substituents, di(meth)acrylate monomers of alkylene diols, and di(meth)acrylate monomers of polyalkylene glycols. Specific examples of the mono(meth)acrylate monomers of alcohols having cyclic substituents include cyclohexyl acrylates, dicyclopentenyloxyethyl acrylates, dicyclopentyl acrylates, isobornyl acrylates, and morpholine acrylates. Specific examples of the di(meth)acrylate monomers of alkylene diols include butanediol diacrylates and hexanediol diacrylates. Specific examples of the di(meth) acrylate monomers of polyalkylene glycols include diacrylates of triethylene glycols.

The solvent-free photocurable resin composition of the present invention can be produced by thoroughly mixing the above-described components by common techniques.

The solvent-free photocurable resin composition of the present invention is applied to the surface of optical disc substrates or the like by a common application technique such as spin coating. Curing the applied film by irradiating with an energy ray such as UV-ray gives a highly transparent protective film that stably adheres to the surface and effectively protects the surface from scratches.

With reference to FIG. 1, an optical disc is schematically shown that has a cured film of the solvent-free photocurable resin composition formed thereon. The optical disc 1 includes an optical disc substrate 2 which is made of polycarbonate or the like and has a recording pattern 2a, a reflective film 3, and a protective film 4 formed thereon. An optical disc protective film 5, formed from the solvent-free photocurable resin composition of the present invention, is disposed on the read-out side 20 of the substrate 2. The optical disc protective film 5 is preferably 2 to 7 μm thick to ensure scratch resistance and light transmittance, though it may have any suitable thickness. The solvent-free photocurable resin composition of the present invention can be used to make protective films to protect not only optical discs, but also various other articles.

EXAMPLES

The present invention will now be described with reference to examples.

Examples 1 through 12 and Comparative Examples 1 through 5

The components given below were uniformly mixed according to the formulas shown in Tables 1 and 2 to make different solvent-free photocurable resin compositions.

Oligomers
  CN975 (an aromatic hexafunctional urethane oligomer, Sartomer Co., Ltd.)
  CN968 (an aliphatic hexafunctional urethane oligomer, Sartomer Co., Ltd.)
  CN973 (an aromatic difunctional urethane oligomer, Sartomer Co., Ltd.)
  EB3700 (a Bis-A type difunctional epoxy oligomer, Daicel-UCB Co., Ltd.)
Trifunctional (Meth)acrylic Acid Ester Monomer
  TMPTA-N (Trimethylolpropane triacrylate, Daicel-UCB Co., Ltd.)
Photopolymerization Initiators
  Irgacure 184 (Ciba Specialty Chemicals Co., Ltd.)
  Darocure 1173 (Ciba Specialty Chemicals Co., Ltd.)
Dilution monomers
<Monofunctional or difunctional (meth)acrylic acid ester monomer>
  Viscoat #155 (a cyclohexyl acrylate, Osaka Organic Chemical Industry Co., Ltd.)
<Fluorine-based (meth)acrylic acid ester monomers having three or more fluorine atoms in its molecule>
  Viscoat 3F (an acrylic acid ester monomer having three fluorine atoms, Osaka Organic Chemical Industry Co., Ltd.)
  Viscoat 4F (an acrylic acid ester monomer having four fluorine atoms, Osaka Organic Chemical Industry Co., Ltd.)
  Viscoat 8F (an acrylic acid ester monomer having eight fluorine atoms, Osaka Organic Chemical Industry Co., Ltd.)
  Viscoat 12F (an acrylic acid ester monomer having twelve fluorine atoms, Osaka Organic Chemical Industry Co., Ltd.)
  Viscoat 17F (an acrylic acid ester monomer having seventeen fluorine atoms, Osaka Organic Chemical Industry Co., Ltd.)

The solvent-free photocurable resin compositions of Examples and Comparative Examples were tested and evaluated for scratch resistance, appearance, and adhesion to substrate. The tests were conducted in the manner described below and the results are shown in Tables 1 and 2.

Scratch Resistance (Taber Abrasion Test, ASTM D1044)

Using spin-coating technique (3000 to 7000 rpm/6 sec), each of the solvent-free photocurable resin compositions was applied to a smooth polycarbonate plate to a thickness of 5 μm. The resin film was then cured by irradiating with a UV-ray emitted from a metal halide lamp (120 W/cm) to a cumulative dose of 300 mJ/cm². The cured protective film was subjected to a Taber abrasion test (load=250 g, 100 rpm, CS-10F, Taber Co., Ltd.). The decrease in the haze was determined for each sample based on the following formula: $([haze]_1-[haze]_2) \times 100/[haze]_1$, where $[haze]_1$=haze of the sample before the Taber abrasion test and $[haze]_2$=haze of the sample after the test. A sample was determined to be "acceptable" (as indicated by "A"), "defective" (as indicated by "C"), or "in-between" (as indicated by "B") when the decrease in haze was less than 10%, 15% or more, or between 10% and 15%, respectively.

Appearance

Using spin-coating technique, each of the solvent-free photocurable resin compositions was applied to a substrate. The resulting resin film was visually observed for smoothness of the film, formation of bubbles, dust adhesion, formation of uneven stripes, or irregular features. A sample was determined to be "acceptable" (as indicated by "A") if none of these characteristics was observed and "defective" (as indicated by "B") if any of the characteristics was observed. Bubbles are formed as the residual solvents evaporate. When used, the solvents therefore need to be evaporated and removed before the resin is cured. The dust adhesion occurs when a hot air stream containing dust particles is blown onto the applied film during the evaporation of the solvent. The formation of uneven stripes occurs when the solvents evaporate partially, resulting in uneven viscosity and, therefore, non-uniform thickness of the resin film. The formation of irregular surface features occurs when the solvents evaporate to cause the temperature of the coating solution to drop. This causes the surface layer of the coating solution to absorb the moisture present in the atmosphere, leading to the formation of irregular surface features.

Adhesion to Substrate (Grid Peeling Test)

Using spin-coating technique, each of the solvent-free photocurable resin compositions was applied to a polycarbonate substrate. A 10×10 grid pattern composed of a set of vertical lines and a set of horizontal lines, spaced 1 mm apart, was cut on the resulting resin film. A strip of adhesive tape was applied over the grid and was peeled. A sample was determined to be "acceptable" (as indicated by "A") when 80 or more of the 100 squares of the grid remained unpeeled and "defective" (as indicated by "C") when less than 80 squares remained unpeeled.

TABLE 1

| | Comp. Ex. 1 | Ex. 1 | Ex. 2 | Ex. 3 | Comp. Ex. 2 | Comp. Ex. 3 | Ex. 4 | Ex. 5 | Ex. 6 | Comp. Ex. 4 |
|---|---|---|---|---|---|---|---|---|---|---|
| Ciba Irgacure 184 | 5 | 5 | 5 | 5 | 5 | 5 | 5 | 5 | 5 | 5 |
| Ciba Darocure 1173 | 5 | 5 | 5 | 5 | 5 | 5 | 5 | 5 | 5 | 5 |
| Viscoat #155 | 10 | 10 | 10 | 10 | 10 | 40 | 30 | 20 | 10 | 0 |
| Viscoat 4F | — | — | — | — | — | — | — | — | — | — |
| Viscoat 8F | 30 | 30 | 30 | 30 | 30 | 0 | 10 | 20 | 30 | 40 |
| Viscoat 12F | — | — | — | — | — | — | — | — | — | — |
| Viscoat 17F | — | — | — | — | — | — | — | — | — | — |
| CN975 | 50 | 45 | 30 | 10 | 0 | 40 | 40 | 40 | 40 | 40 |
| CN968 | — | — | — | — | — | — | — | — | — | — |
| CN973 | — | — | — | — | — | — | — | — | — | — |
| EB3700 | — | — | — | — | — | — | — | — | — | — |
| TMPTA | 0 | 5 | 20 | 40 | 50 | 10 | 10 | 10 | 10 | 10 |
| Viscosity (at 25° C.) | 119 | 96 | 78 | 25 | 18 | 38 | 46 | 59 | 54 | 100 |
| Scratch resistance | A | A | A | B | C | C | A | A | A | A |
| Smoothness | B (Bumps formed on the end surface) | A | A | A | A | A | A | A | A | A |
| Bubbles | A | A | A | A | A | A | A | A | A | A |
| Dust | A | A | A | A | A | A | A | A | A | A |
| Uneven stripes | A | A | A | A | A | A | A | A | A | A |
| Irregular surface features | A | A | A | A | A | A | A | A | A | A |
| Adhesion to substrate | A | A | A | A | A | A | A | A | B | C |

TABLE 2

| | Ex. 7 | Ex. 8 | Ex. 9 | Ex. 10 | Ex. 11 | Ex. 12 | Comp. Ex. 5 | Ex. 13 |
|---|---|---|---|---|---|---|---|---|
| Ciba Irgacure 184 | 5 | 5 | 5 | 5 | 5 | 5 | 5 | 5 |
| Ciba Darocure 1173 | 5 | 5 | 5 | 5 | 5 | 5 | 5 | 5 |
| Viscoat #155 | 10 | 10 | 10 | 10 | 10 | 10 | 10 | 10 |
| Viscoat 4F | 30 | — | — | — | — | — | — | — |
| Viscoat 8F | — | 30 | — | — | 30 | 30 | 30 | — |
| Viscoat 12F | — | — | 30 | — | — | — | — | — |
| Viscoat 17F | — | — | — | 30 | — | — | — | — |
| CN975 | 40 | 40 | 40 | 40 | — | — | — | 40 |
| CN968 | — | — | — | — | 40 | — | — | — |
| CN973 | — | — | — | — | — | 40 | — | — |
| EB3700 | — | — | — | — | — | — | 40 | — |
| TMPTA | 10 | 10 | 10 | 10 | 10 | 10 | 10 | 10 |
| Viscoat 3F | — | — | — | — | — | — | — | 30 |
| Viscosity [mPa·S] (at 25° C.) | 41.68 | 79 | 124 | 15 | 65 | 175 | 280 | 29 |
| Scratch resistance | A | A | A | A | A | A | C | A |
| Smoothness | A | A | A | B* | A | A | A | A |
| Bubbles | A | A | A | A | A | A | A | A |
| Dust | A | A | A | A | A | A | A | A |
| Uneven stripes | A | A | A | A | A | A | A | A |
| Irregular surface features | A | A | A | A | A | A | A | A |
| Adhesion to substrate | A | A | A | A | A | A | A | A |

*Fluorine-based acrylate separated from the other components

The results of Examples 1 through 3 and Comparative Examples 1 and 2 indicate that the smoothness of the resin film is lost if the urethane (meth)acrylate oligomer is not used (Comparative Example 1), whereas the scratch resistance of the resin film decreases if the trifunctional (meth)acrylic acid ester monomer is not used (Comparative Example 2). It has also been demonstrated that the desired amounts of the urethane (meth)acrylate oligomer (CN975) and the trifunctional (meth)acrylic acid ester monomer (TMPTA) are at least 10 to 45 wt % and at least 5 to 40 wt %, respectively.

The results of Examples 4 through 6 and Comparative Examples 3 and 4 indicate that the scratch resistance of the resin film decreases if the dilution monomer does not contain the fluorine-based (meth)acrylic acid ester monomer having three or more and less than seventeen fluorine atoms in its molecule (Comparative Example 3), whereas the adhesion to substrate decreases if the monofunctional or difunctional (meth)acrylic acid ester monomer is not used (Comparative Example 4). It has also been demonstrated that the desired amounts of the fluorine-based (meth)acrylic acid ester monomer having three or more and less than seventeen fluorine atoms in its molecule and the monofunctional or difunctional (meth)acrylic acid ester monomer are at least 10 to 40 wt % and at least 10 to 30 wt %, respectively.

The results of Examples 7 through 10 and Example 13 indicate that the scratch resistance of the resin film decreases if the dilution monomer does not contain the fluorine-based (meth)acrylic acid ester monomer having three or more and less than seventeen fluorine atoms in its molecule (Comparative Example 3), whereas the adhesion to substrate decreases if the monofunctional or difunctional (meth)acrylic acid ester monomer is not used (Comparative Example 4). It has also been demonstrated that the desired amounts of the fluorine-based (meth)acrylic acid ester monomer having three or more and less than seventeen fluorine atoms in its molecule and the monofunctional or difunctional (meth)acrylic acid ester monomer are at least 10 to 40 wt % and at least 10 to 30 wt %, respectively.

The results of Examples 11 and 12 and Comparative Example 5 indicate that the aromatic hexafunctional product used as the urethane (meth)acrylate oligomer in Example 1 or other examples can be replaced by the aliphatic hexafunctional product (Example 11) or the aromatic difunctional group (Example 12). It has been proven that the scratch resistance is lost when the epoxy oligomer is used in place of the urethane (meth)acrylate oligomer.

Comparative Example 6

As in Example 1, a solvent-free, fluorine-free hard coat (U-HA, viscosity=20000 mPa·S at 25° C., Shin Nakamura Chemical Co., Ltd.) was tested and evaluated for scratch resistance, appearance, and adhesion to substrate. It turned out that the hard coat was too thick to apply to the substrate by spin-coating.

Comparative Example 7

As in Example 1, a solvent-containing, fluorine-free hard coat (U-100H, viscosity=230 mPa·S at 25° C., Shin Nakamura Chemical Co., Ltd.) containing 20 wt % toluene as a diluent was tested and evaluated for scratch resistance, appearance, and adhesion to substrate. The results demonstrated that the hard coat resulted in decreased smoothness of the film, formation of bubbles, dust adhesion, formation of uneven stripes, and irregular surface features. In addition, the hard coat was too thick to apply to the substrate by spin-coating.

Comparative Example 8

As in Example 1, a solvent-free, fluorine-free hard coat (SK3200, viscosity=50 mPa·S at 25° C., Sony Chemical & Information Device Co., Ltd.) was tested and evaluated for scratch resistance, appearance, and adhesion to substrate. It was proven that while the hard coat showed acceptable performance in terms of smoothness of the film, bubble formation, dust adhesion, formation of uneven stripes, irregular surface features, but the scratch resistance of the film was undesirably low.

Industrial Applicability

The solvent-free photocurable resin composition of the present invention contains, aside from organic solvents, a fluorine-based (meth)acrylic acid ester monomer having three or more and less than seventeen fluorine atoms in its molecule and a monofunctional or difunctional (meth)acrylic acid ester monomer, each serving as a reactive dilution monomer, in predetermined proportions. Therefore, the solvent-free photocurable resin composition of the present invention can be applied to the surface of optical discs or the like and can be photocured to form a protective film that can not only stably adhere to the surface and effectively protect the surface from scratches, but is also highly transparent. Although the solvent-free photocurable resin composition of the present invention is ideal for making protective films to protect optical discs, the low viscosity of the composition also makes it suitable for making protective films to protect optical films used in flat panel displays.

The invention claimed is:

1. A solvent-free photocurable resin composition consisting of:
   a hexafunctional urethane(meth)acrylate oligomer in an amount of from 10 to 45 wt% of the total resin composition,
   a trifunctional (meth)acrylic acid ester monomer selected from the group consisting of glycerol tri(meth)acrylate, pentaerythritol tetra(meth)acrylate, dipentaerythritol penta(meth)acrylate, and dipentaerythritol hexa(meth)acrylate in an amount of from 5 to 40 wt% of the total resin composition,
   a photopolymerization initiator, and
   a dilution monomer,
   wherein the dilution monomer consists of a fluorine-based (meth)acrylic acid ester monomer having three or more and less than seventeen fluorine atoms in its molecule and a monofunctional or difunctional (meth)acrylic acid ester monomer in amounts of from 10 to 40 wt% and from 10 to 30 wt% of the total resin composition, respectively, and
   wherein the photocurable resin composition, when photocured, forms a scratch-resistant film.

2. The solvent-free photocurable resin composition according to claim 1, wherein the monofunctional or difunctional (meth)acrylic acid ester monomer is a mono(meth)acrylate monomer of an alcohol having a cyclic substituent, a di(meth)acrylate monomer of an alkylene diol, or a di(meth)acrylate monomer of a polyalkylene glycol.

3. The solvent-free photocurable resin composition according to claim 2, wherein the mono(meth)acrylate monomer of an alcohol having a cyclic substituent is a cyclohexyl acrylate, a dicyclopentenyloxyethyl acrylate, a dicyclopentyl acrylate an isobornyl acrylate, or a morpholine acrylate.

4. The solvent-free photocurable resin composition according to claim 2, wherein the di(meth)acrylate monomer of an alkylene diol is a butanediol diacrylate or a hexanediol diacrylate.

5. The solvent-free photocurable resin composition according to claim 2, wherein the di(meth)acrylate monomer of a polyalkylene glycol is a diacrylate of a triethylene glycol.

6. The solvent-free photocurable resin composition according to claim 2, wherein the fluorine-based (meth)acrylic acid ester monomer is trifluoroethylacrylate, tetrafluoropropylacrylate, tetrafluoroethylacrylate, octafluoropentylacrylate, tetrafluoroethyl methacrylate, or octafluoropentyl methacrylate.

7. An optical disc having a cured film of the solvent-free photocurable resin composition of claim 1 formed thereon.

8. The optical disc according to claim 7, wherein the monofunctional or difunctional (meth)acrylic acid ester monomer is a mono(meth)acrylate monomer of an alcohol having a cyclic substituent, a di(meth)acrylate monomer of an alkylene diol, or a di(meth)acrylate monomer of a polyalkylene glycol.

9. The optical disc according to claim 8, wherein the mono(meth)acrylate monomer of an alcohol having a cyclic substituent is a cyclohexyl acrylate, a dicyclopentenyloxyethyl acrylate, a dicyclopentyl acrylate, an isobonyl acrylate, or a morpholine acrylate.

10. The optical disc according to claim 8, wherein the di(meth)acrylate monomer of an alkylene diol is a butanediol diacrylate or a hexanediol diacrylate.

11. The optical disc according to claim 8, wherein the di(meth)acrylate monomer of a polyalkylene glycol is a diacrylate of a triethylene glycol.

12. The optical disc according to claim 8, wherein the fluorine-based (meth)acrylic acid ester monomer is trifluoroethylacrylate, tetrafluoropropylacrylate, tetrafluoroethylacrylate, octafluoropentylacrylate, tetrafluoroethyl methacrylate, or octafluoropentyl methacrylate.

13. The solvent-free photocurable resin composition according to claim 1, wherein the hexafunctional urethane (meth)acrylate oligomer is present in an amount of from 30 to 45 wt% of the total resin composition.

14. The optical disc according to claim 7, wherein the hexafunctional urethane(meth)acrylate oligomer is present in an amount of from 30 to 45 wt% of the total resin composition.

* * * * *